United States Patent [19]

Hashimoto et al.

[11] Patent Number: 5,077,886
[45] Date of Patent: Jan. 7, 1992

[54] BRAKE CALIPER MOUNTING METHOD APPARATUS

[75] Inventors: Kenji Hashimoto, Hiroshima; Takashi Kamohara, Fuchu; Noriaki Maeda, Hatsukaichi; Hideyuki Uesugi, Higashi; Motomiti Asano, Hiroshima, all of Japan

[73] Assignee: Mazda Motor Corporation, Hiroshima, Japan

[21] Appl. No.: 598,986

[22] Filed: Oct. 17, 1990

[30] Foreign Application Priority Data

| Oct. 17, 1989 [JP] | Japan | 1/269964 |
| Jan. 17, 1990 [JP] | Japan | 2-6451 |
| Jan. 22, 1990 [JP] | Japan | 2-10757 |

[51] Int. Cl.$^5$ .............................. B23P 11/00
[52] U.S. Cl. ........................ 29/434; 29/464; 29/468
[58] Field of Search ............ 29/464, 466, 467, 468, 29/434

[56] References Cited

U.S. PATENT DOCUMENTS

| 1,689,766 | 10/1928 | Bendix | 29/467 X |
| 3,061,922 | 11/1962 | Lysett | 29/464 |
| 3,694,890 | 10/1972 | Arning et al. | 29/468 X |
| 4,071,940 | 2/1978 | Hazelton | 29/468 |
| 4,231,147 | 11/1980 | Witt | 29/464 X |
| 4,564,994 | 1/1986 | Marx | 29/468 |
| 5,012,569 | 5/1991 | Mazuta | 29/464 X |

Primary Examiner—Timothy V. Eley
Assistant Examiner—C. Richard Martin
Attorney, Agent, or Firm—Wenderoth, Lind & Ponack

[57] ABSTRACT

A brake caliper mounting method inserts a disk into a gap between a pair of pads carried in an opposing spaced relationship on a caliper to assemble the disk to the caliper. The caliper is held by a holding means, a positioning means is contacted with a face of the disk to determine a fitting position of the caliper onto the disk, and the caliper held by the holding means is fit onto the disk along the position of the face of the disk determined by the positioning means.

8 Claims, 17 Drawing Sheets

BRAKE CALIPER MOUNTING METHOD APPARATUS

BACKGROUND OF THE INVENTION

1. Field of the Invention

This invention relates to a brake caliper mounting method for a disk brake for inserting a disk into a gap between a pair of pads held in an opposing spaced relationship on a caliper to assemble the disk to the caliper.

2. Description of the Prior Art

In recent years, disk brakes increasingly have been employed in automobiles. A disk brake apparatus is constituted principally from a brake disk, and a caliper extending across the disk and including a pressurizing cylinder disposed therein and a pair of pads which are slidably contacted with opposite faces of the disk by operation of the cylinder. The pads are held on the caliper in an opposing, spaced relationship from each other and disposed in an opposing relationship to the opposite faces of the disk inserted in a gap therebetween. Then, upon braking, the cylinder in the caliper is operated to press the pads strongly against the disk to generate braking force.

For such disk brake apparatus, automation is demanded of an assembling operation of inserting the disk between the pads.

However, since the distance between the pads is greater only by a small distance than the thickness of the disk, a very high degree of accuracy is required for such insertion of the disk between the pads, which is a serious problem in achieving automation of such assembling operation.

SUMMARY OF THE INVENTION

Accordingly, it is an object of the present invention to provide a brake caliper mounting method by which a disk can be inserted readily and smoothly into a gap between a pair of pads on a caliper.

In order to attain the object, according to the present invention, there is provided a brake caliper mounting method for inserting a disk into a gap between a pair of pads carried in an opposing spaced relationship on a caliper to assemble the disk to the caliper. Such method comprises a first step of holding the caliper by means of holding means, a second step of contacting positioning means with a face of the disk to determine a fitting position of the caliper onto the disk, and a third step of fitting the caliper held by the holding means onto the disk along the portion of the face of the disk determined by the positioning means.

More particularly, the second step includes the steps of moving the positioning means which has a guide face and a contacting member to a position near the disk such that the contacting member overlaps with the disk, and moving the positioning means in a thicknesswise direction of the disk so that the contacting member thereof is contacted with the face of the disk to position the guide face of the positioning means.

Further, the third step includes the steps of feeding the caliper to a position near the guide face of the positioning means such that either one of the pads of the caliper may be overlapped with the guide face thereof, moving the caliper to the guide face of the positioning means so that the one pad contacts the guide face thereof, slidably moving the one pad on the guide face of the positioning means to advance the caliper from the guide face to the disk, retracting the guide face of the positioning means from the disk, and moving the caliper further along the disk to mount the caliper onto the disk.

Further, at the step of moving the caliper to the guide face of the positioning means so that the one pad contacts the guide face, the caliper is moved over a distance greater than a distance of a space between the one pad of the caliper and the guide face, while such excessive amount of movement is resiliently absorbed.

Further, in order to carry out the method described above, there is provided a brake caliper mounting apparatus for inserting a disk into a gap between a pair of pads carried in an opposing spaced relationship on a caliper to assemble the disk to the caliper, which comprises means for holding the caliper thereon and moving the caliper toward the disk in order to insert the disk into the gap between the pads, and positioning means for contacting with a face of the disk to determine a fitting position of the caliper onto the disk.

The positioning means has a guide face which is contacted with the face of the disk and is coplanar therewith in order to guide a fitting operation of the caliper onto the disk by the caliper holding and moving means.

Further, the positioning means is constructed to be movable toward the disk and also movably in the thicknesswise direction of the disk so as to approach the face of the disk.

Also, the positioning means may be formed as a plate which is thinner than the gap between the pads and is disposed such that an end portion thereof adjacent the disk extends in a tangential direction to the disk.

Further, the positioning means may include a contacting member which is projected toward the disk from the guide face and contacted with the face of the disk so that the guide face may be disposed in a same plane as the face of the disk.

On the other hand, the caliper holding and moving means includes caliper supporting means for holding the caliper thereon, and caliper fitting means for moving the caliper holding means toward the disk.

The caliper holding means includes a base member, a pair of clamps for clamping the caliper therebetween, a slide body supported for movement in a clamping direction on the base member and supporting the clamps for movement in a clamping direction while permitting operational errors of the clamps, clamp driving means for operating the clamps in a synchronized relationship with each other, and a floating mechanism provided on the base member for permitting movement of the slide body.

Also, the caliper holding means may include a base member, a first clamp adapted to be inserted into the gap between the pads, a second clamp for contacting the caliper and cooperating with the first clamp to clamp the caliper therebetween, a slide body supported for movement in an operating direction of the second clamp on the base member and supporting the first and second clamps for movement while permitting operational errors of the first and second clamps, clamp driving means for individually operating the first and second clamps, and a floating mechanism provided on the base member for permitting movement of the slide body.

The brake caliper mounting apparatus further comprises caliper supplying means for supplying calipers, a jig pallet for receiving the disk thereon, transport means for transporting the jig pallet, a robot having a working arm for feeding a caliper from the caliper supplying means to the jig pallet, and position setting means provided adjacent the robot. The positioning means is incorporated in the position setting means, the caliper holding means is mounted on the working arm, and the caliper fitting means is formed by the working arm.

With the method of the present invention, when the positioning means contacts the face of the disk, then the guide face of the positioning means is positioned in substantially the same plane as the face of the disk. Consequently, by slidably moving one of the pads of the caliper on the guide face, the disk can be inserted readily and smoothly into the gap between the pads.

In this manner according to the present invention, it is possible to assemble a caliper onto a disk easily and automate such assembling operation while overcoming the difficulty arising from the fact that the thickness of the disk is not significantly different from the dimension between the pair of pads of the caliper.

Meanwhile, in the method of the present invention described above, the first step may include the steps of holding the caliper in a predetermined posture at a supplying position of the caliper, causing the holding means to access the caliper held at the caliper supplying position, restraining the caliper to a posture of the holding means in a condition in which the gap between the pads is expanded to a maximum extent, cancelling the held condition of the caliper at the caliper supplying position, removing the caliper from the caliper supplying position by the holding means, feeding the caliper to an assembling position with the disk, and positioning the holding means with respect to the assembling position.

Meanwhile, the second step may include moving the positioning means in the thicknesswise direction of the disk so as to contact the positioning means with the face of the disk and moving the holding means in a synchronized relationship with the movement of the positioning means to effect positioning of the holding means with respect to the disk.

Further, the third step may include inserting the disk into the gap between the pair of pads, cancelling, after completion of the inserting operation, the held condition of the caliper by the holding means, mounting the caliper onto the disk by fastening means, and cancelling the restraint of the posture of the caliper.

When the positioning means is contacted with the face of the disk, the holding means and hence the caliper and pads are positioned accurately with respect to the disk. In this instance, since the positioning means can be moved toward the disk in the thicknesswise direction thereof and contacted with the face of the disk without requiring a severe assembling tolerance, such contacting operation can be performed readily by a working arm of an ordinary robot.

Thereafter, the disk is inserted into the gap between the pair of pads in a condition wherein the contacted condition of the positioning means with the face of the disk is maintained.

The apparatus for carrying out the present invention may further include an assembling device on which the caliper holding and moving means and the positioning means are carried integrally.

The caliper holding and moving means includes caliper holding means for holding the caliper thereon, and caliper fitting means for moving the caliper holding means toward the disk.

The caliper holding means may include a chucking mechanism which is inserted into the gap between the pads so as to make the gap a maximum size and to support the caliper thereon.

The chucking mechanism may include a ring-shaped chuck body which is circumferentially divided into a plurality of elements and has a hollow in the inside thereof, the chuck body being adapted to be inserted into the gap between the pads, a wedge-shaped chuck operating body adapted to be removably inserted into the hollow of the chuck body to expand the chuck body, resilient means for urging the chuck body into a contracted condition, and chuck driving means for operating the chuck operating body.

The caliper holding means may include a pair of chuck arms for clamping the caliper therebetween, and a block body adapted to be removably inserted into the gap between the pads to maintain the gap in a widened condition.

The positioning means may include an arm body extending toward the disk farther than the caliper held by the caliper holding and moving means, and arm body driving means for moving the arm body in a thicknesswise direction of the disk so that the arm body may approach the face of the disk.

The assembling device may include a frame, a first slider supported on the frame for movement in the thicknesswise direction of the disk and a second slider supported of the first slider for movement toward the disk. The arm body is carried on the first slider, the caliper holding means is carried on the second slider, the arm body driving means is provided between the frame and the first slider in order to drive the arm body, and the caliper fitting means is provided between the first slider and the second slider in order to drive the caliper holding means.

The assembling device further may include means for contacting the caliper to position and hold the caliper parallel to the face of the disk.

The caliper positioning and holding means may include a cushioning mechanism for exerting resiliency upon contacting the caliper.

The brake caliper mounting apparatus further comprises a supplying station for supplying the caliper, a receiving station on which the disk is disposed, the receiving station being adapted to receive and assemble the caliper to the disk, a robot having a working arm for receiving the caliper from the supplying station and feeding the caliper to the receiving station, and mounting means provided at the receiving station for mounting the disk inserted in the gap between the pads onto the caliper. The assembling device is mounted on the working arm.

The brake caliper mounting apparatus further comprises means for defining a position between the assembling device and the receiving station.

The supplying station includes means for holding the caliper in a predetermined posture.

Preferably, the assembling device has two-component construction including a first slider including the arm body of the positioning means and a second slider mounted for sliding movement on the first slider and carrying thereon the caliper holding means. In such instance, the first slider is driven by the arm body driving means while the second slider is driven by the caliper inserting means. The advantage of such construction resides in that, during insertion of the disk into the gap between the pads, there is no need of slidably moving the arm body on the disk. Consequently, the arm body can be contacted over a wide area with the face of the disk from the beginning of the operation, thereby further effectively achieving the positioning function.

According to the method of the present invention as described above, it is possible to make assembly of a caliper onto a disk an easy operation and to automate such operation, thereby overcoming the difficulty arising from the fact that the thickness of the disk is not significantly different from the dimension between the pair of pads of the caliper.

The method of the present invention further comprises a step of positioning the pair of pads in advance into a condition wherein ends thereof at which the disk is to be inserted into the gap between the pads are expanded, and the apparatus for achieving such operation of the present invention includes means for expanding ends of the pads at which the disk is to be inserted into the gap between the pads.

With such construction, when the caliper is to be mounted, the ends of the pads at which the disk is to be inserted into the gap between the pads are expanded beyond a preset dimension of the gap. Accordingly, there is an advantage that insertion of the disk into the gap is very easy.

DESCRIPTION OF THE PREFERRED EMBODIMENTS

In the following, preferred embodiments of the present invention will be described with reference to the drawings.

FIGS. 1 to 4 show a brake caliper mounting apparatus of a first embodiment of the present invention.

Figure 1:
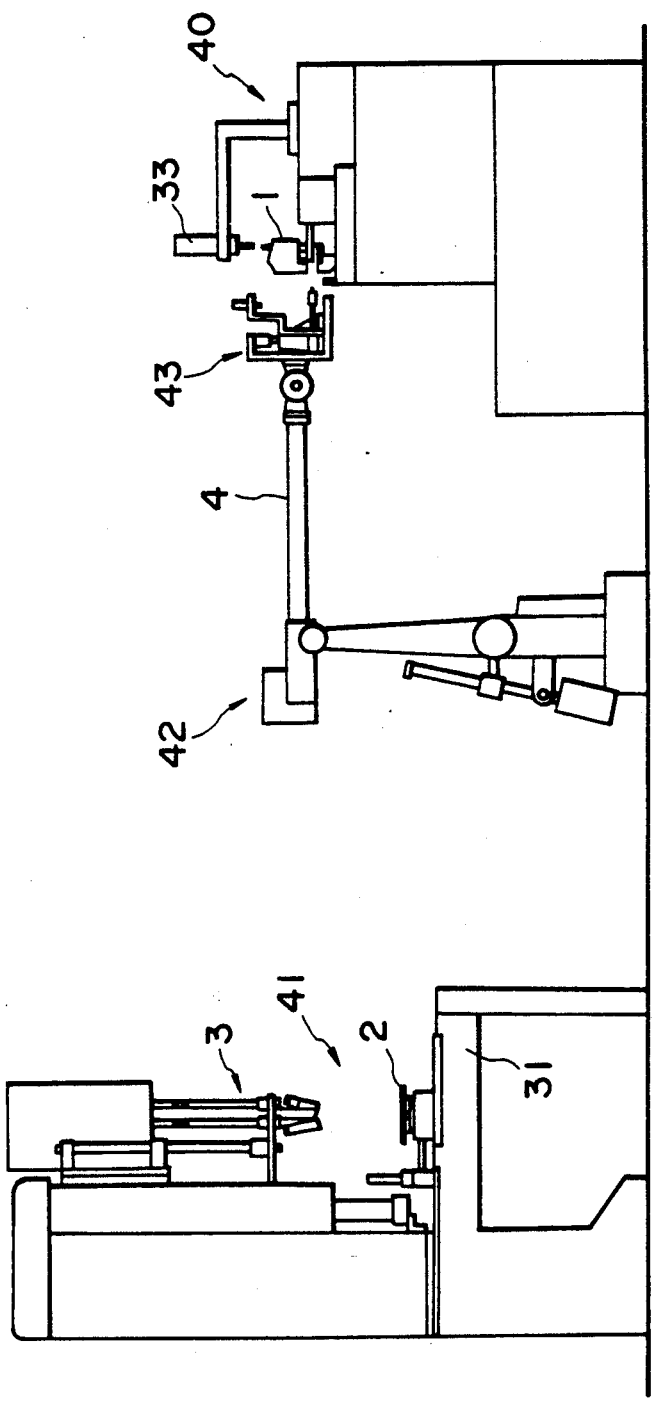
FIG. 1 is a side elevational view of a brake caliper mounting apparatus according to a first embodiment of the present invention.

Referring first to FIG. 1, the brake caliper mounting apparatus includes a supplying station 40 for supplying a caliper 1, and a receiving station 41 for receiving a caliper 1. A caliper 1 is assembled to a disk 2 at the receiving station 41. Movement of a caliper 1 from the supplying station 40 to the receiving station 41 is performed making use of a robot 42. An assembling device 43 according to the present invention is incorporated at an end portion of an arm 4 of the robot 42. A bolting machine 3 for mounting caliper 1 to disk 2 by means of a bolt is disposed at the receiving station 41.

Figure 2:
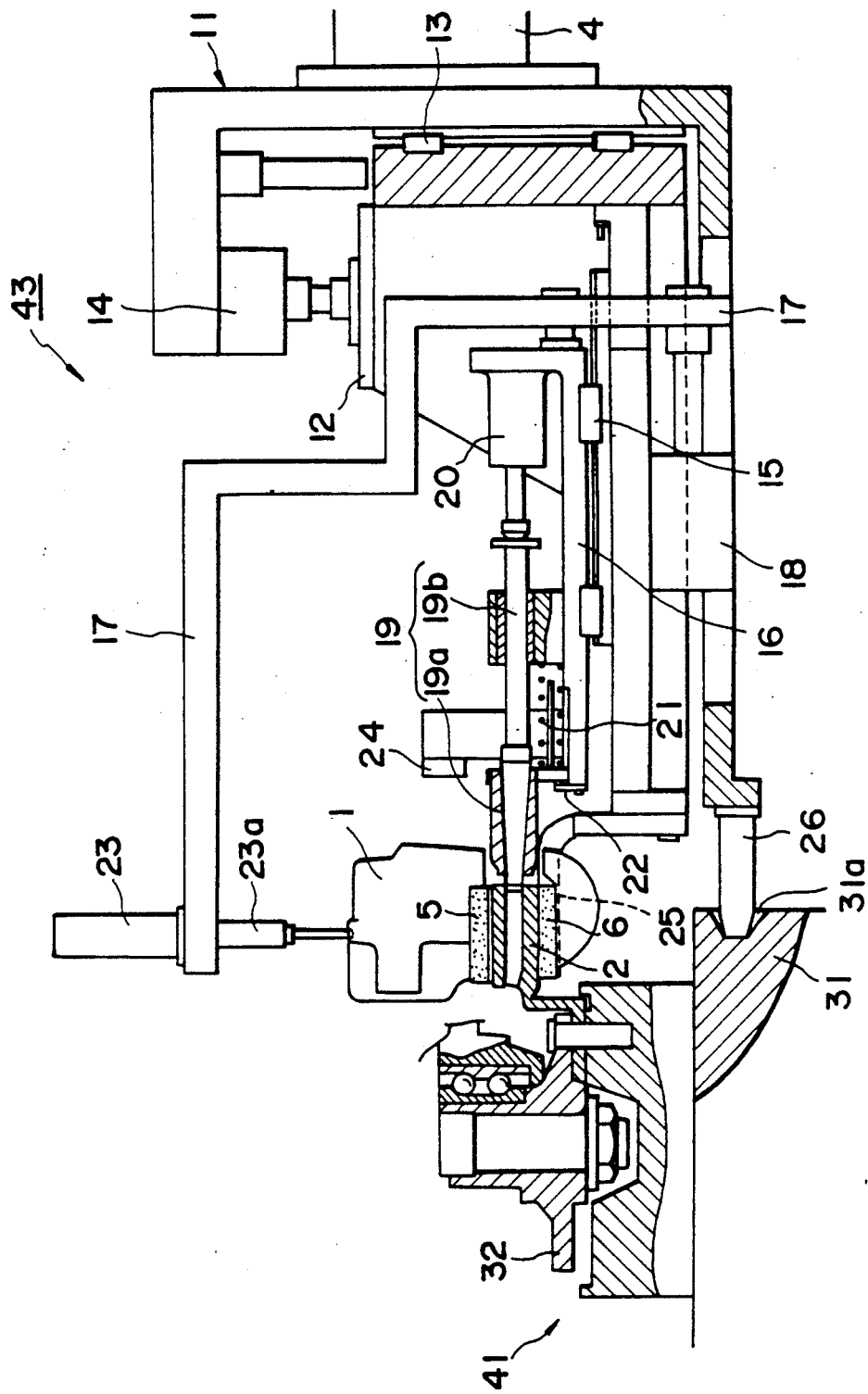
FIG. 2 is a side elevational sectional view showing details of an assembling device of the brake caliper mounting apparatus of FIG. 1.

The assembling device generally has a chucking function, which will be described in detail with reference to FIGS. 2 to 4.

A fixed frame 11 is secured to an end of the robot arm 4 and has a substantially channel-shape opened forwardly away from the end of the arm 4. A support table 12 serving as a first member is carried for sliding movement in upward and downward directions on the fixed frame 11 by way of a slider 13. The support table 12 is driven to move in the upward or downward direction by a cylinder 14 serving as first driving means. A movable bed 16 serving as a second member is carried for sliding movement in a horizontal direction on the support table 12 by way of another slider 15. The movable bed 16 is driven to move by way of a connecting arm 17 by a cylinder 18 mounted on the support table 12 and serving as second driving means.

A collet chuck 19 and a cylinder 20 for opening or closing the collet chuck 19 are mounted on the movable bed 16. The collet chuck 19 is adapted to be inserted into a gap between a pair of pads 5 and 6 carried on a caliper 1 to substantially hold the caliper 1 thereon and also has a function of holding such pads 5 and 6 in a spaced relationship from each other by a possible maximum distance. More particularly, the collet chuck 19 includes a chuck body 19a formed from two upper and lower halves, and an operating rod 19b having a wedge-shaped end which is advanced into and retracted from the inside of the chuck body 19a. The chuck body 19a is opened when the operating rod 19b is pushed by the cylinder 20. On the other hand, the chuck body 19a is normally urged by a spring not shown in a closing direction in which the distance between the upper and lower halves is decreased. The chuck body 19a is mounted for sliding movement in a horizontal direction on the movable bed 16 and is normally urged in the leftward direction in FIG. 2 by a spring 21 while such leftward movement thereof is limited by a stopper 22. The cylinder 20 is an air cylinder, and the driving force thereof is smaller than the driving force of the cylinder 18.

The connecting arm 17 extends, at a free end portion thereof, upwardly above the chuck body 19a, and a cylinder 23 is secured to an end of such extension of the connecting arm 17 such that it extends in upward and downward directions. The cylinder 23 is provided to position caliper 1 in a horizontal plane as hereinafter described. The cylinder 23 includes a cushioning mechanism 23a which makes use of a spring for assuring contact of the cylinder 23 with caliper 1 irrespective of upward or downward displacement of the support table 12. A receiving portion 24 is provided at a left end portion of the movable bed 16 such that it will face a rear face of caliper 1 carried by means of the chuck body 19a as hereinafter described.

Figure 3:
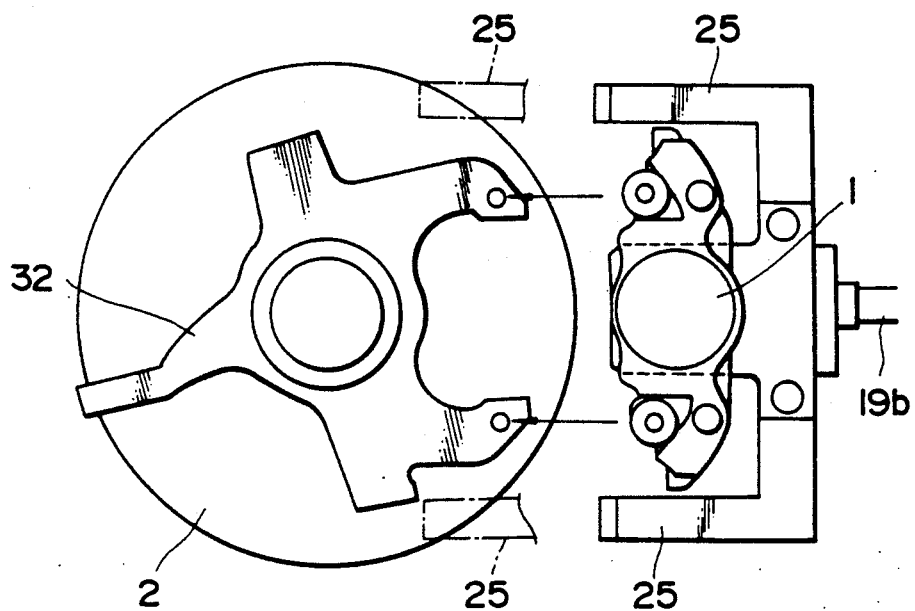
FIG. 3 is a plan view illustrating a relationship between a positioning arm and a disk in the brake caliper mounting apparatus of FIG. 1.
Figure 4:
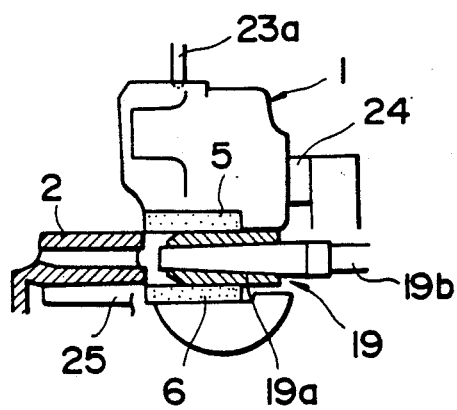
FIG. 4 is a side elevational sectional view showing an assembled condition of the disk to a caliper in the brake caliper mounting apparatus of FIG. 1.

A pair of positioning arms 25 serving as positioning means are provided on the support table 12 as shown in FIG. 3. The positioning arms 25 are finished to a high precision so that upper faces thereof may closely contact with a face of disk 2. It is to be noted that, in FIGS. 2 and 4, the positioning arms 25 are shown in a closely contacting condition with a face of disk 2. The positioning arms 25 extend farther forwardly than caliper 1 carried on the chuck body 19a. In FIG. 3, reference numeral 32 denotes a steering arm.

A pin 26 is provided at an end of a lower portion of the fixed frame 11. The pin 26 is adapted to be inserted into a recess 31a formed in a bed 31 of the receiving station 41 to position the fixed frame 11 with respect to the bed 31.

Operation of the apparatus having such construction as described above now will be described.

First, at the supplying station 40, a caliper 1 is held in a predetermined posture by a cylinder 33 provided at the supplying station 40. The assembling device 43 held on the robot 42 is moved toward the caliper 1 to a position at which the chuck body 19a is opposed to a gap between a pair of pads 5 and 6 of the caliper 1. In this condition, the cylinder 18 is operated to advance the movable bed 16 until the chuck body 19a is inserted into the gap between the pads 5 and 6. In this instance, the cylinder 20 and the operating rod 19b remain at their respective retracted positions, and accordingly, the chuck body 19a is inserted between the pads 5 and 6 while it is kept in a closed condition.

Thereafter, the cylinder 23 is operated to contact an end portion thereof with the caliper 1 (refer to FIG. 4) to position the caliper 1 in its horizontal plane. After such positioning, the cylinder 20 is operated to advance the operating rod 19 so that it may be inserted deeply into the chuck body 19a. Consequently, the chuck body 19a is opened to hold the caliper 1 firmly thereon while the pads 5 and 6 are spaced from each other by a maximum possible distance.

After such holding of the caliper 1 by the chuck body 19a is completed, the restraint of the caliper 1 by the cylinder 33 is cancelled. Thereafter, the cylinder 18 is operated to retract the movable bed 16, thereby completing the transfer of the caliper 1 from the supplying station 40 to the assembling device 43.

The robot 42 to which the caliper 1 has been transferred feeds the caliper 1 to the receiving station 41. Thereupon, the positioning pin 26 is inserted into the recess 31a formed in the bed 31 of the receiving station 41 to position the fixed frame 11 with respect to the bed 31. In this instance, the arms 25 of support table 12 are at a position lower than a bottom face of the disk 2 as shown in FIG. 2.

After such positioning of the fixed frame 11, the cylinder 14 is first operated to lift the support table 12 until the positioning arms 25 are contacted with the lower face of the disk 2. Consequently, the chuck member 19a is positioned in the upward and downward directions with respect to a plane of the disk 2.

After completion of such positioning by the positioning arms 25, the cylinder 18 is operated to move the movable bed 16 leftwardly toward the center of the disk 2. Consequently, the disk 2 begins to be inserted into the gap between the pads 5 and 6. After such insertion proceeds by a small amount, an end of the operating rod 19b is contacted with an outer peripheral face of the disk 2. Upon further advancement of the movable bed 16 after such contact, the operating rod 19b is left at the contacting position. This is because the driving force of the cylinder 20 is smaller than the driving force of the cylinder 18. When such condition of the operating rod 19b is detected by a sensor not shown, the cylinder 20 is operated to retract the operating rod 19b to remove the force opening the chuck body 19a. Upon further advancement of the movable bed 16 thereafter 1, the disk 2 is gradually inserted deeply into the gap between the pads 5 and 6, and as such advancement proceeds, the chuck body 19a and the operating rod 19b are retracted relatively from the support table 12. After the disk 2 is inserted to a predetermined depth into the gap between the pads 5 and 6 by the advancement of the movable bed 16, the movable bed 16 is stopped. After such stopping of the movable bed 16, the caliper 1 is mounted onto the steering arm 32 by the bolting machine 3.

After a series of assembling steps is completed in this manner, the restriction of the caliper 1 by the cylinder 23 is cancelled. Thereafter, the support table 12 is displaced downwardly, and the robot 42 is moved to the supplying station 40 in order to receive a caliper 1 for a next assembling operation.

While this embodiment is described as above, the positioning arms 25 may otherwise be provided on the movable bed 16. In such instance, in a process of inserting a disk 2 into a gap between a pair of pads 5 and 6, the positioning arms 25 will be slidably moved on a face of the disk 2. On the other hand, where the positioning arms 25 are provided on the support table 12 as in the described embodiment, such sliding movement is eliminated, and besides the positioning arms 25 can be held in contact over a wide area with a face of the disk from the beginning of an inserting operation of the disk 2 into the gap between the pads 5 and 6.

Meanwhile, holding of a caliper 1 may be performed otherwise by making use of a pair of chucking arms for clamping caliper 1 from above and below. In such instance, though not shown, a small block formed from a resilient body should be interposed between the pads 5 and 6 to hold the pads 5 and 6 in an open condition. Such small block should be pushed out by the disk 2 upon insertion of the disk 2 between the pads 5 and 6. The small block thus pushed out can be recovered and used as an opening jig for the next pads 5 and 6.

A second embodiment of the present invention now will be described with reference to FIGS. 5 to 10.

Figure 5:
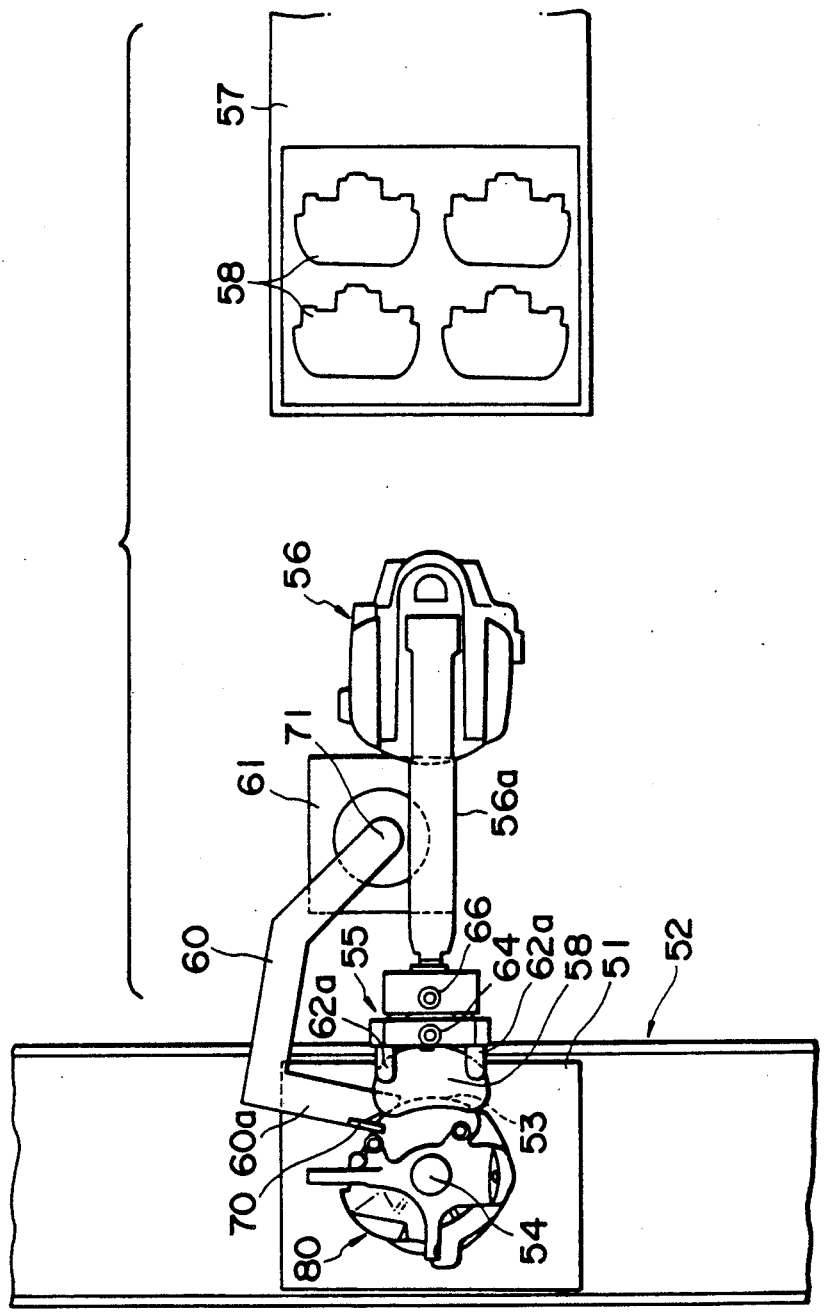
FIG. 5 is a plan view of a brake caliper mounting apparatus according to a second embodiment of the present invention.
Figure 6:
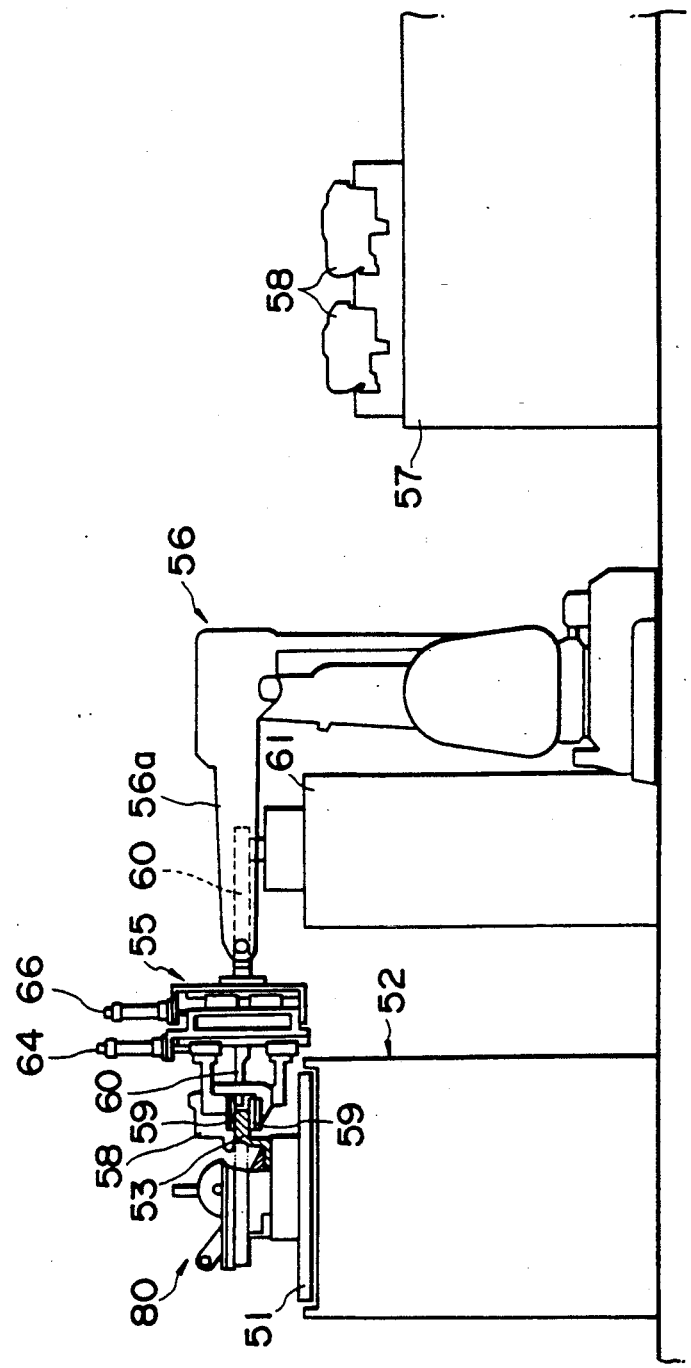
FIG. 6 is a side elevational view, partly in section, of the brake caliper mounting apparatus of FIG. 5.

FIG. 5 is a plan view of a brake caliper mounting apparatus according to the present invention, and FIG. 6 is a side elevational view, partly in section, of the brake caliper mounting apparatus. General construction of the brake caliper mounting apparatus will first be described with reference to FIGS. 5 and 6.

The brake caliper mounting apparatus includes a jig pallet 51 which is transported by a pallet transporting conveyor 52. A workpiece 80 is placed on and secured to the jig pallet 51. In the present embodiment, the workpiece 80 is a steering knuckle assembly for a front wheel of an automobile, and a disk 53 of a disk brake apparatus is mounted for rotation on the assembly. Then, the workpiece 80 is mounted on the jig pallet 51 in a condition wherein an axis 54 of rotation of the disk 53 is directed in a vertical direction, that is, in a condition wherein a pad contacting face of the disk 53 extends horizontally.

A working robot 56 having an arm 56a is disposed adjacent the pallet transporting conveyor 52. The working robot 56 is constituted to operate in a manner such that a caliper 58 supplied from a supply conveyor 57 is clamped by a robot hand 55 mounted at an end of the arm 56a and then carried toward the workpiece 80 along a predetermined route, whereafter it is mounted onto the workpiece 80. In this instance, the caliper 58 is moved toward the workpiece 80 in a condition wherein sliding contact faces of a pair of pads 59 mounted in advance in the caliper 58 with a disk 53 extend horizontally, and the disk 53 is inserted into a gap between the pads 59.

A guide plate setting jig 61 having a guide plate 60 in the form of an arm is provided alongside the working robot 56. The guide plate 60 is mounted on the jig 61 such that it may be pivoted in a horizontal plane around an axis 71 and make parallel movement by small distances in upward and downward directions. An end portion of the guide plate 60 is shaped such that it is bent substantially at a right angle toward the workpiece 80. Construction and operation of the guide plate 60 will be hereinafter described.

Figure 7:
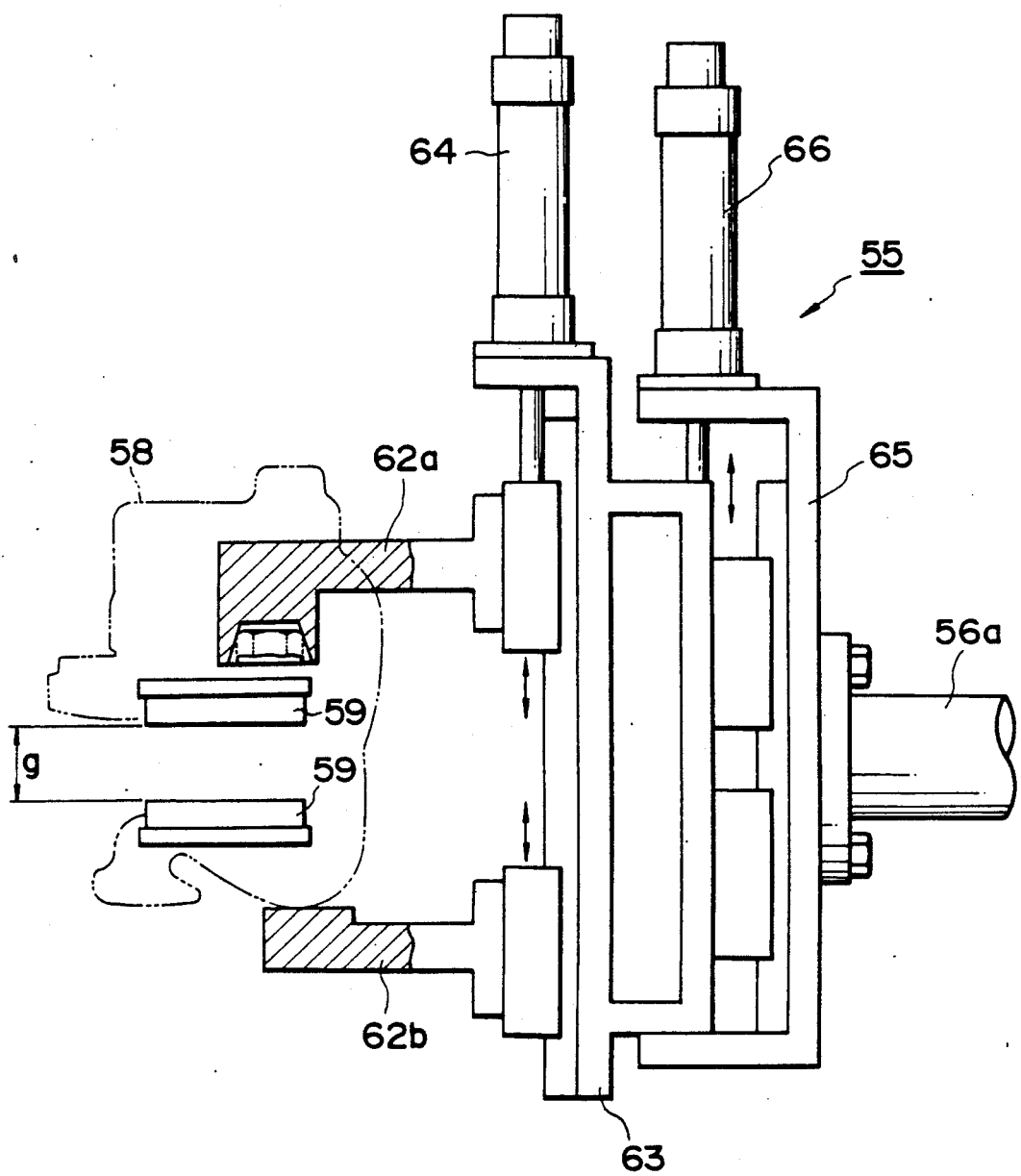
FIG. 7 is a side elevational view, partly in section, showing an example of construction of a robot hand for clamping a caliper in the brake caliper mounting apparatus of FIG. 5.

FIG. 7 shows an example of construction of the robot hand 55 provided on the working robot 56. The robot hand 55 has a pair of upper clamp arms 62a and a lower central clamp arm 62b for clamping a caliper 58 from above and below, respectively, and a slide base 63 supporting the clamp arms 62a and 62b for sliding movement in upward and downward directions thereon. A clamp cylinder 64 is mounted on the slide base 63 for operating the clamp arms 62a and 62b in a mutually synchronized relationship with each other so that the clamping directions or the unclamping directions of the clamp arms 62a and 62b may coincide with each other. When the clamp cylinder 64 is operated, clamp arms 62a and 62b are slidably moved in an upward or downward direction by way of a synchronizing mechanism not shown to clamp or unclamp a caliper 58. Further, the slide base 63 is mounted for sliding movement in upward and downward directions on base member 65 secured to an end of the robot arm 56a, thereby constituting a floating mechanism for absorbing possible displacement of the clamp arms 62a and 62b in upward and downward directions. A piston of a balance cylinder 66 secured to the base member 65 is connected to the slide base 63.

Figure 8:
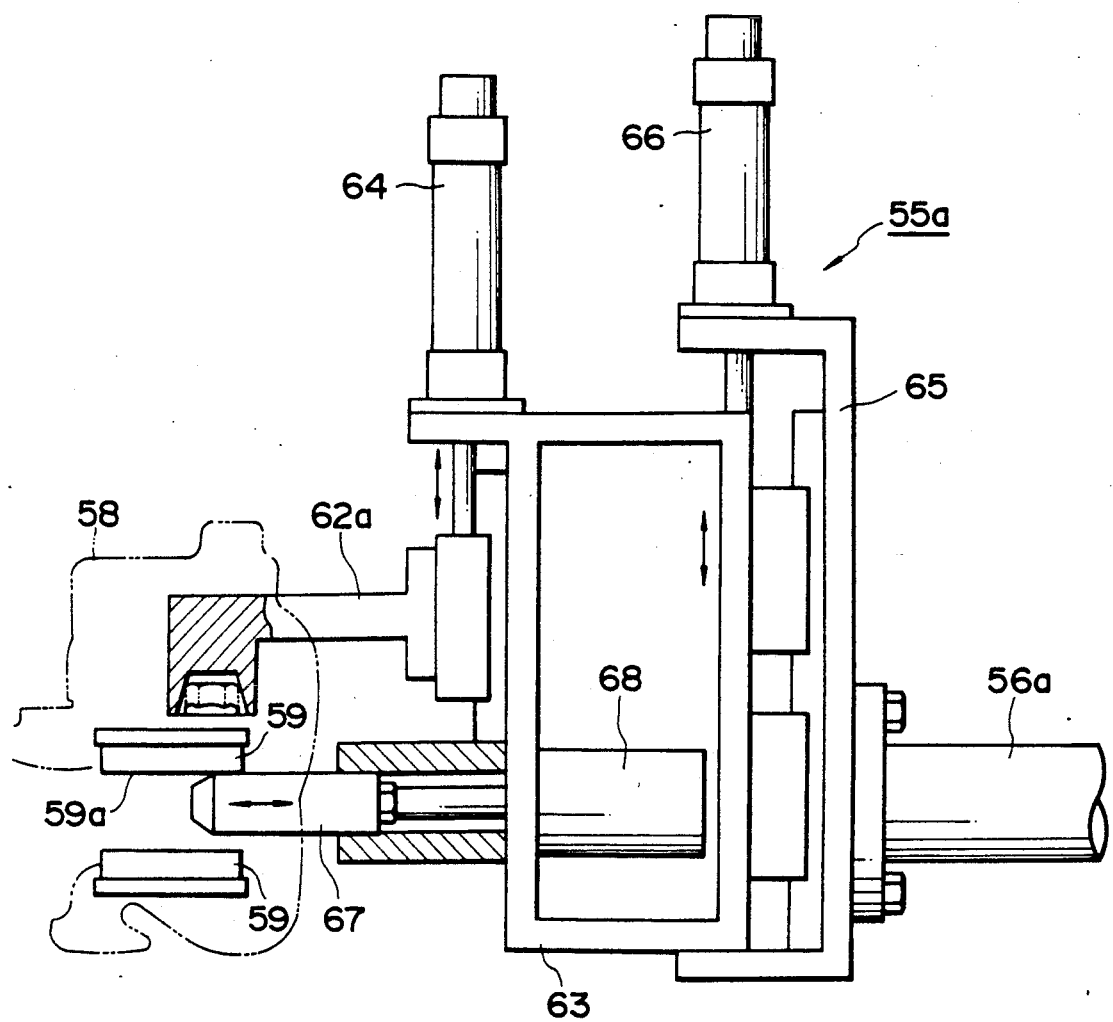
FIG. 8 is a similar view but showing another example of construction of a robot hand in the brake caliper mounting apparatus of FIG. 5.
Figure 9:
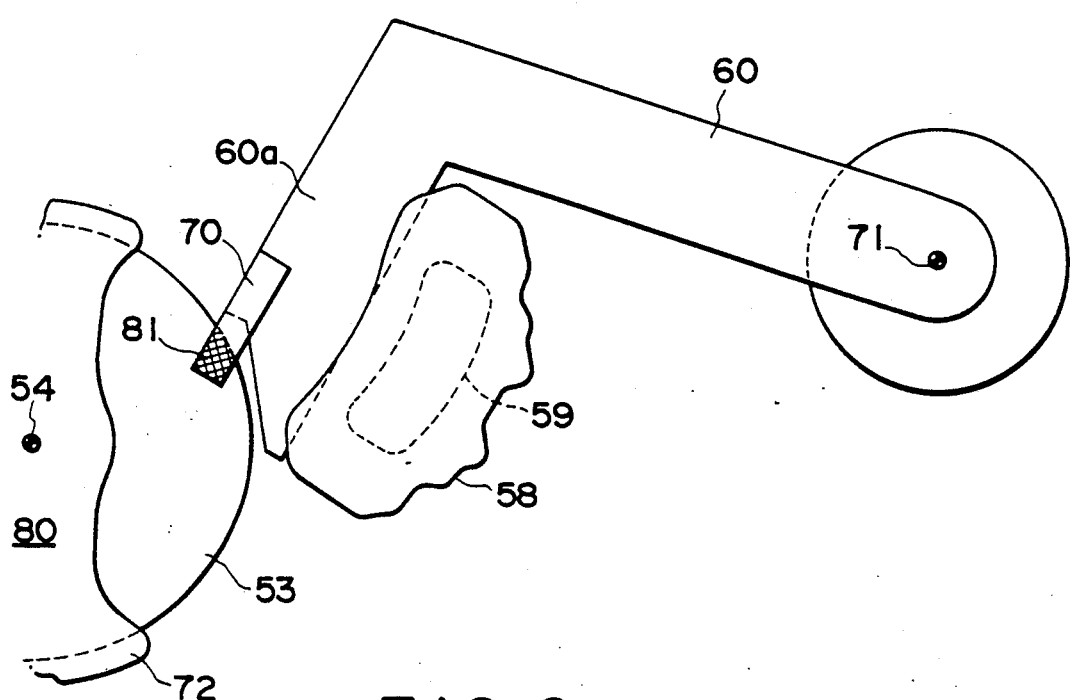
FIG. 9(A) to 9(D) are plan views showing successive steps of a brake caliper mounting method by the brake caliper mounting apparatus of FIG. 5.
Figure 9:
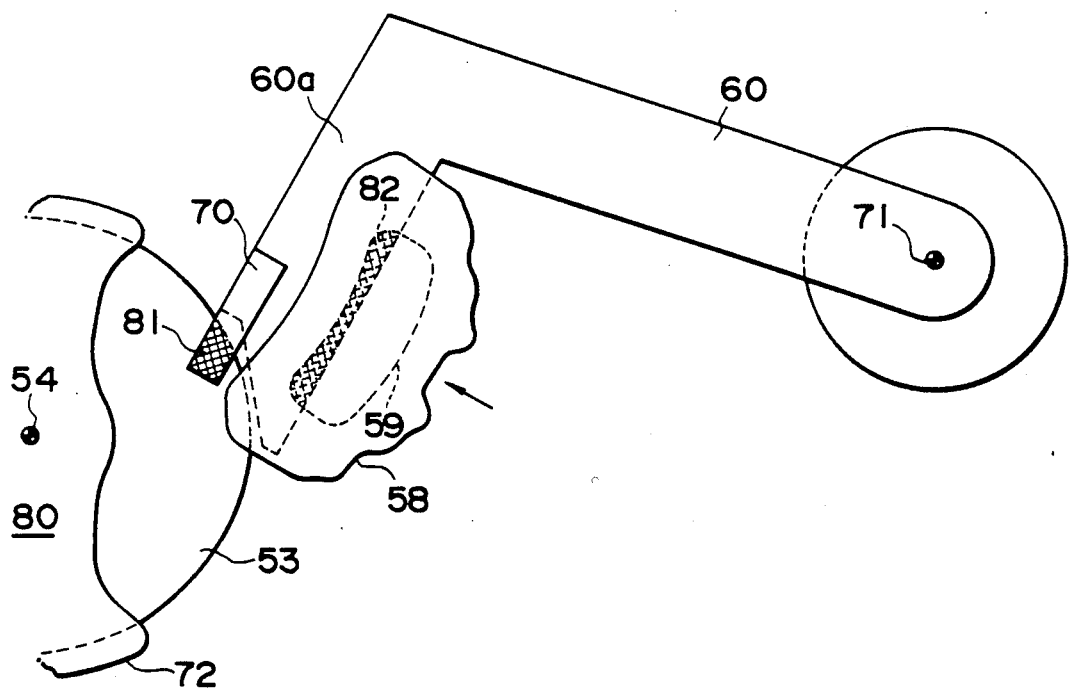
Figure 9:
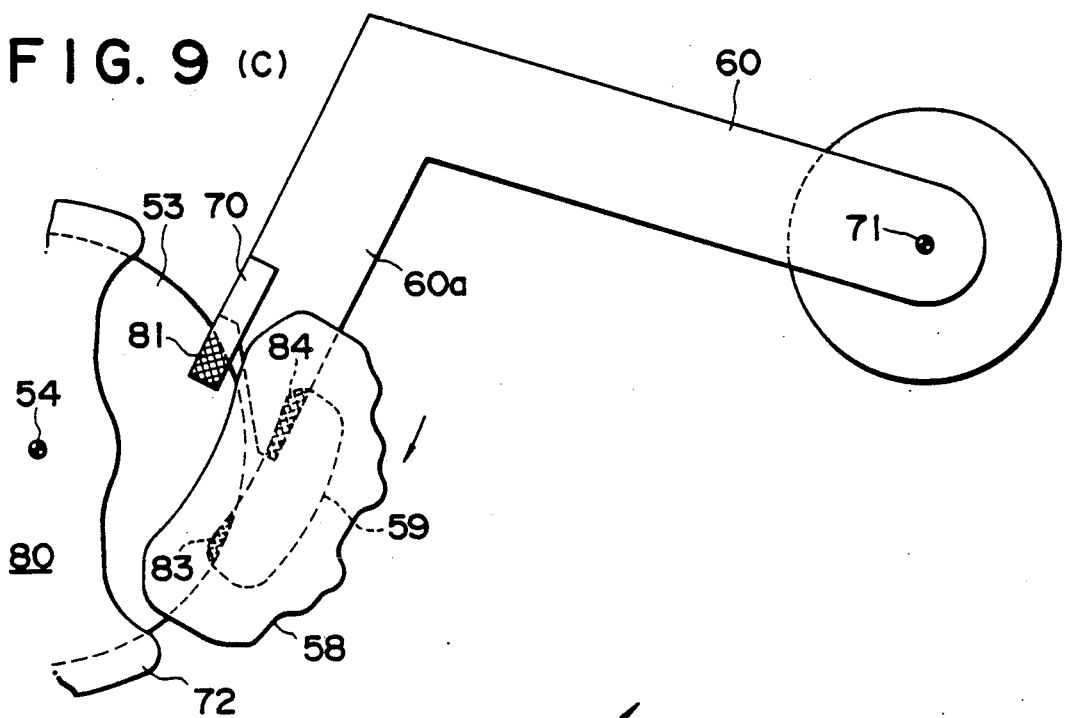
Figure 9:
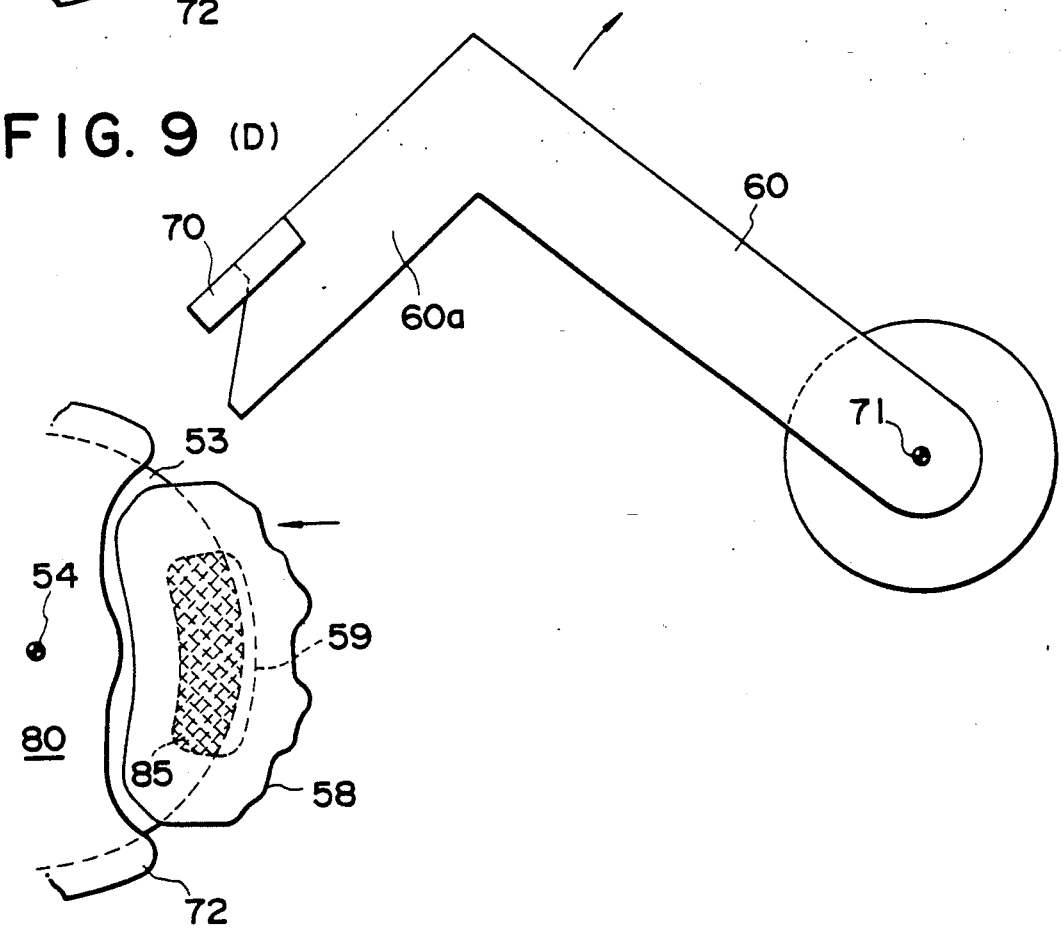
Figure 10:
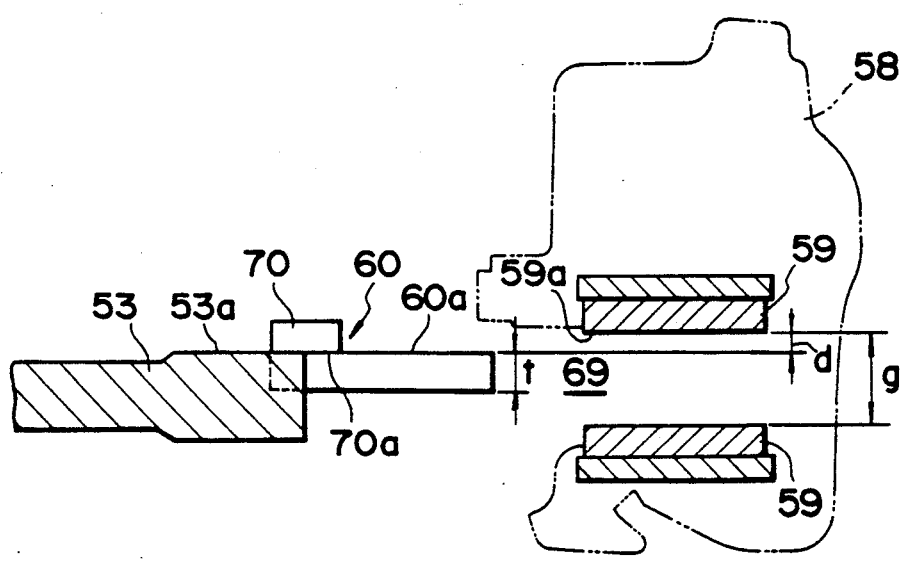
FIGS. 10(A) to 10(D) are side elevational sectional views showing successive steps of the brake caliper mounting method.
Figure 10:
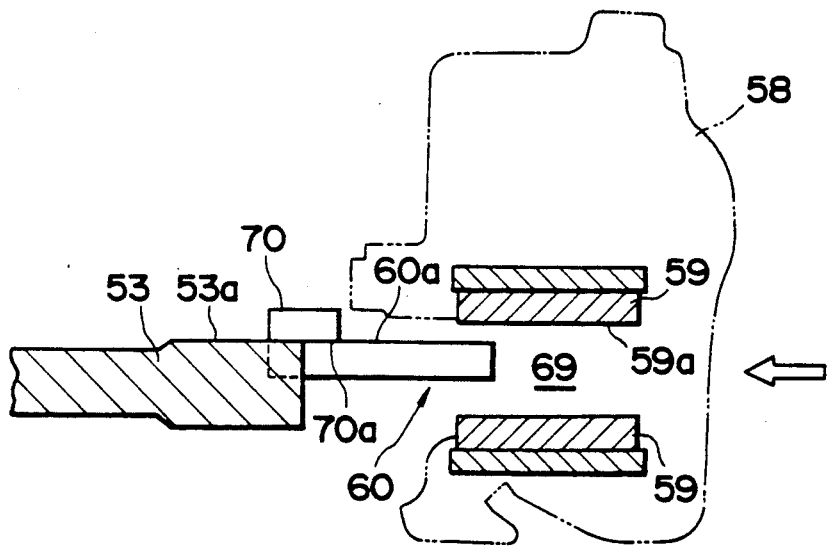
Figure 10:
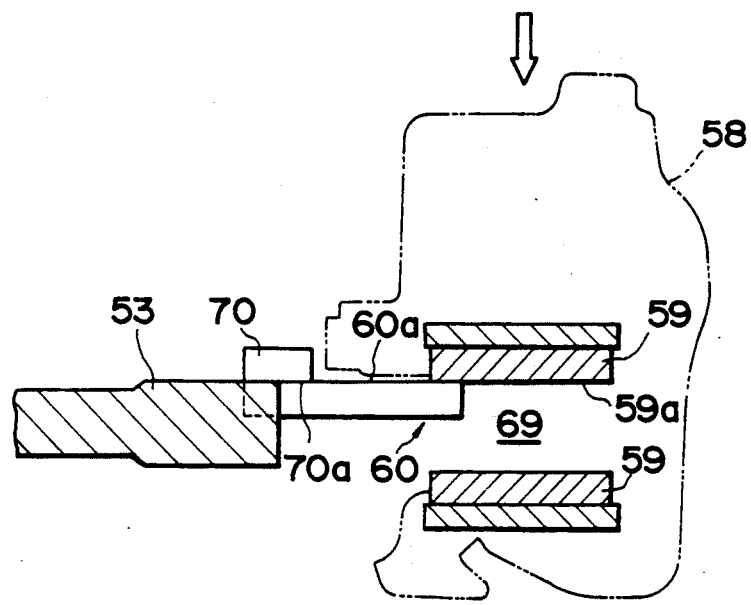
Figure 10:
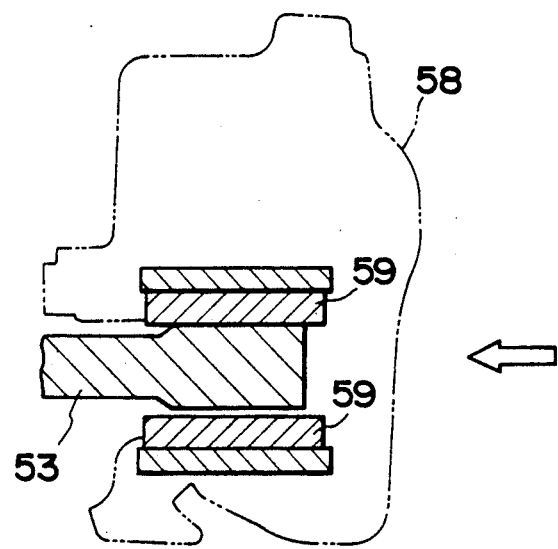

FIG. 8 shows another example of construction of a robot hand. The robot hand 55a includes, in place of the lower clamp arm 62b of the robot hand 55 of FIG. 7, a clamp member 67 movable in a horizontal direction. The clamp member 67 is constituted such that it is projected into a gap between a pair of pads 59 of a caliper 58 by operation of a cylinder 68 and contacts from below with a sliding face 59a of an upper pad 59 to support the caliper 58. Since construction of the other portion of the robot hand 55a is similar to the of the robot hand 55 shown in FIG. 7, like parts are denoted by like reference numberals and detailed description thereof is omitted herein.

Meanwhile, on an upper face of an end portion of guide plate 60 which has a shape that is bent substantially at the right angle toward the workpiece 80, a horizontal flat face serving as a guide face 60a is formed as shown in FIGS. 9(A) to 9(D) and FIGS. 10(A) to 10(D). The thickness t of the portion of the guide plate 60 at which the guide face 60a is smaller than the distance of a gap 69 between the pads 59 as seen in FIG. 10(A). For example, when the dimension g of the gap 69 between the pads 59 is 24 mm, the thickness t is set to be 10 mm or so. Further, a contact element 70 is provided at a corner of the guide face 60a of the guide plate 60. The contact element 70 extends forwardly and has on a lower face thereof a contacting face 70a for contacting with an upper face of disk 53. The contact element 70 is shaped as a bar, and the contacting face 70a formed on the lower face thereof is in a same plane as the guide face 60a of the guide plate 60.

The apparatus of the second embodiment has a construction as described above, and a brake caliper mounting operation by means of such apparatus now will be described with reference to FIGS. 9(A) to 9(D) and FIGS. 10(A) to 10(D). It is to be noted that, in FIGS. 9(A) to 9(D), reference numeral 72 denotes a dust cover.

(1) First, as shown in FIG. 9(A), the guide plate 60 is pivoted in the counterclockwise direction around the axis 71 to a position above disk 53 so that, as viewed in plan, an end portion of the contact element 70 thereof overlaps in an overlapping area 81 with the disk 53. Then, the guide plate 60 is moved downwardly until the contacting face 70a of the lower face of the contact element 70 is contacted with an upper face 53a of the disk 53. Consequently, the guide face 60a of the guide plate 60 is coplanar with the upper face of the disk 53. Subsequently, a caliper 58 is carried from the supply conveyor 57 toward a workpiece 80 on the jig pallet 51 using the robot hand 55 and is positioned at a position forwardly of the guide plate 60. The condition then is shown in FIG. 10(A). At this time, the caliper 58 is set such that the lower face 59a (the face for sliding contact with the disk 53) of an upper one of the pair of pads 59 thereof is spaced upwardly by a distance d (for example, d=5 mm) from the guide face 60a of the guide plate 60.

(2) Subsequently, the caliper 58 is advanced (horizontally moved) to a position in which, as shown in FIGS. 9(B) and 10(B), the guide plate 60 and a front edge of the upper pad 59 are overlapped with each other in a belt-like area 82 as viewed in plan.

(3) Then, the caliper 58 is moved downwardly until the lower face 59a of the upper pad 59 is contacted with the guide face 60a of the guide plate 60 as shown in FIG. 10(C). In this instance, however, in order to ensure contact of the lower face 59a of the upper pad 59 with the guide face 60a, the caliper 58 is moved downwardly be an excessive amount, e.g. 5 mm or so. Such excessive amount of downward movement is absorbed by the floating mechanism of the robot hand 55.

(4) Subsequently, the caliper 58 is moved horizontally such that the lower face 59a of the upper pad 59 is slidably moved on the guide face 60a of the guide plate 60 as shown in FIG. 9(C). At this time, since the upper face of the disk 53 is in the same plane as the guide face 60a, the disk 53 will advance into the gap between the pads 59. Consequently, the pads 59 and the disk 53 are overlapped with each other in an overlapping area 83. Meanwhile, an overlapping area between the pads 59 and the guide plate 60 also remains as denoted by reference numeral 84 in FIG. 9(C).

(5) Subsequently, the guide plate 60 is pivoted in the clockwise direction around the axis 71 to allow the guide plate 60 to escape the disk 53 and the workpiece 80 as shown in FIG. 9(D). Thereafter, the caliper 58 is advanced while it is pivoted in a horizontal plane. Consequently, the lower face 59a of the upper pad 59 is slidably moved on the upper face 53a of the disk 53 until the disk 53 and the pads 59 are overlapped with each other in a predetermined overlapping area 85 as shown in FIG. 10(D), thereby mounting the caliper 58 onto the workpiece 80.

The brake caliper mounting method and apparatus according to the second embodiment have become clear by the description given above. In the present embodiment, the apparatus is constituted such that the guide face 60a of the guide plate 60 and the contacting face 70a of the lower face of the contact element 70 are in the same plane. Consequently, the lower face of the upper pad 59 slides on the guide face 60a and rides onto the upper face 53a of the disk 53, and the disk 53 is inserted smoothly into the gap between the pads 59. However, the contacting face 70a may be located slightly lower than the guide face 60a within a range within which insertion of a disk 53 into the gap 69 is permitted.

A third embodiment of the present invention now will be described with reference to FIGS. 11 to 19.

Figure 11:
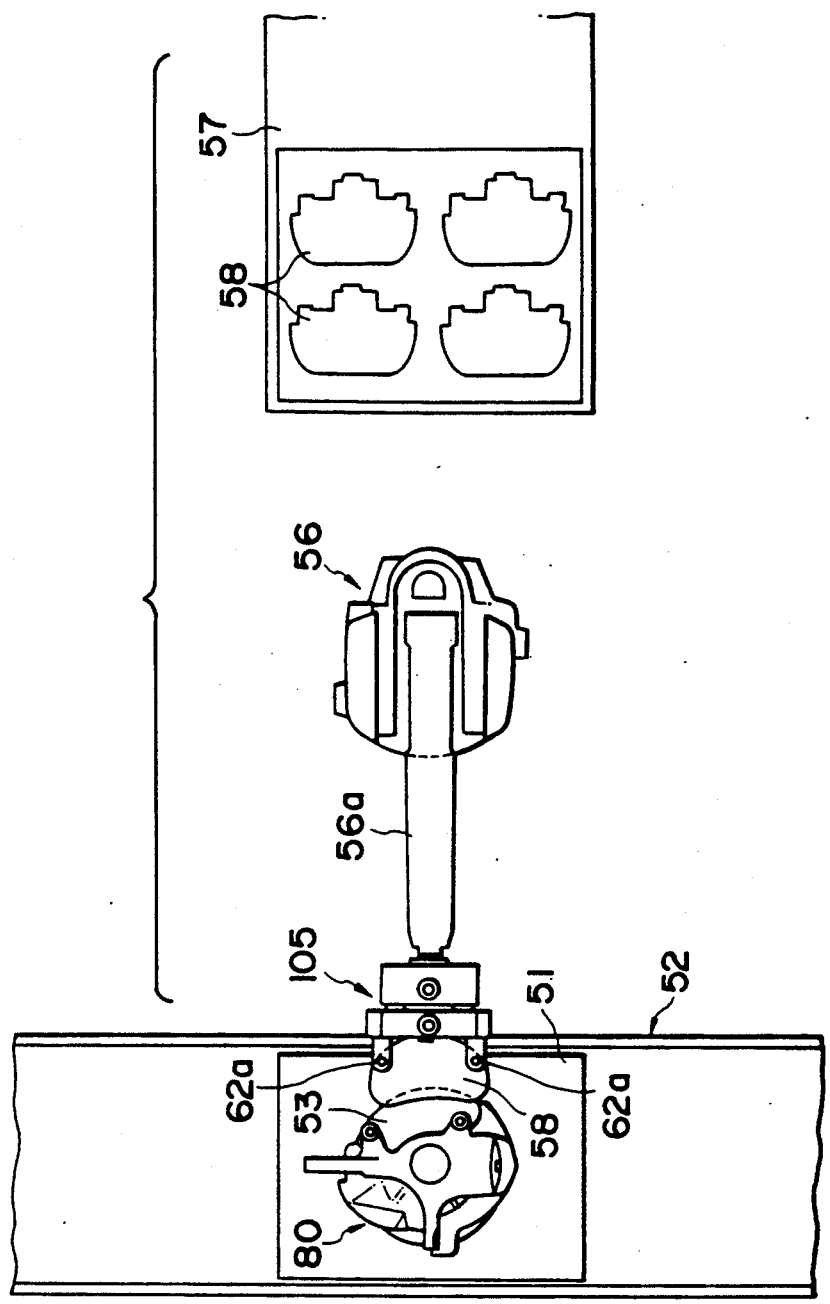
FIG. 11 is a plan view of a brake caliper mounting apparatus according to a third embodiment of the present invention.
Figure 12:
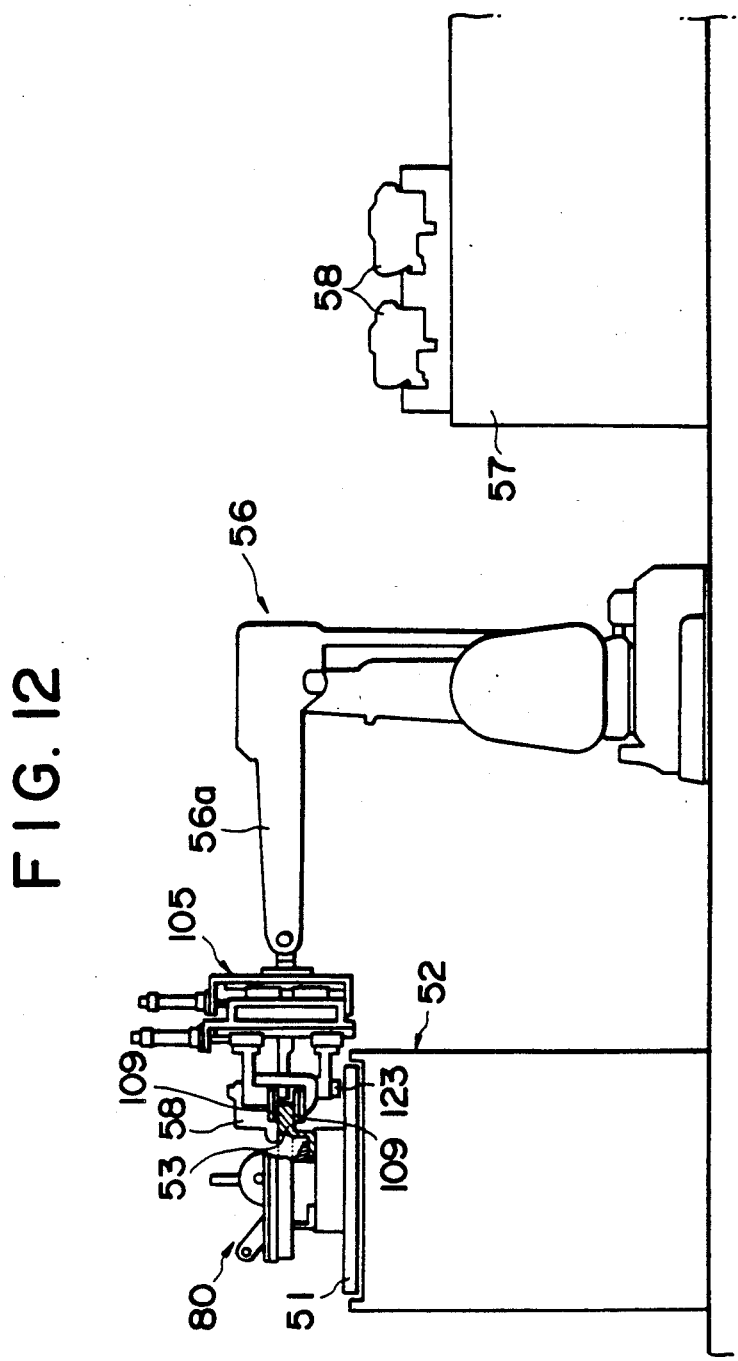
FIG. 12 is a side elevational view, partly in section, of the brake caliper mounting apparatus of FIG. 11.

FIG. 11 is a plan view of a brake caliper mounting apparatus of a third embodiment of the present invention, and FIG. 12 is a side elevational view, partly in section, of the brake caliper mounting apparatus. General construction of the brake caliper mounting apparatus will first be described with reference to FIGS. 11 and 12.

The brake caliper mounting apparatus of the third embodiment has a construction substantially similar to that of the brake caliper mounting apparatus of the second embodiment, and like reference numerals denote like elements which have like constructions and functions.

Similarly as in the brake caliper mounting apparatus of the second embodiment, a working robot 56 is constituted to operate such that it clamps a caliper 58 supplied from a supply conveyor 57 by means of a robot hand 105 mounted at end of an arm 56a thereof, and then carries the caliper 58 toward a workpiece 80 along a predetermined route, whereafter it mounts the caliper 58 onto the workpiece 80. In this instance, the caliper 58 is moved toward the workpiece 80 in a condition wherein contact faces of a pair of pads 109 mounted in advance in the caliper 58 extend horizontally, and a disk 53 is inserted into a gap between the pads 109.

Figure 13:
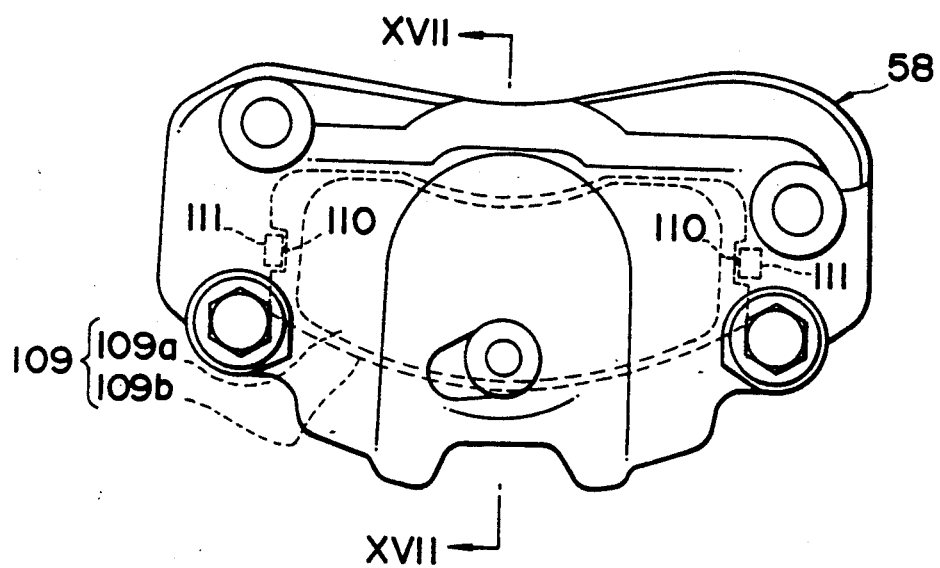
FIG. 13 is a plan view of a caliper in the brake caliper mounting apparatus of FIG. 11.
Figure 14:
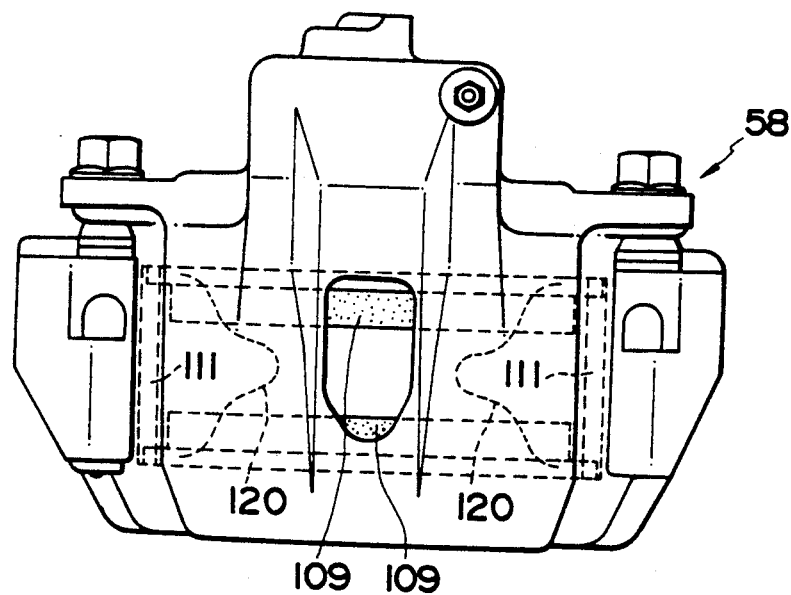
FIG. 14 is a rear elevational view of the caliper of FIG. 13.
Figure 15:
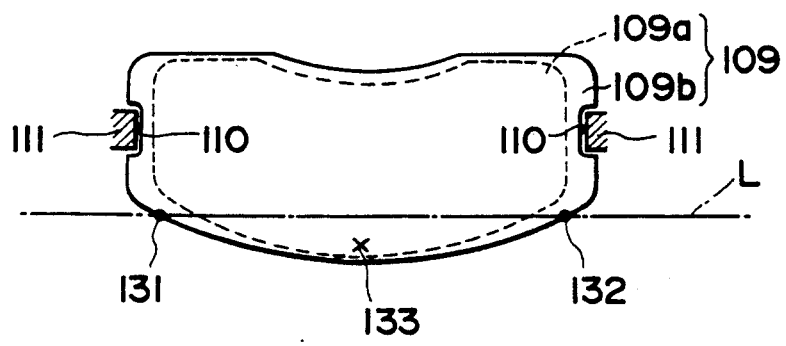
FIG. 15 is a bottom plan view of a pad provided on the caliper of FIG. 13.
Figure 16:
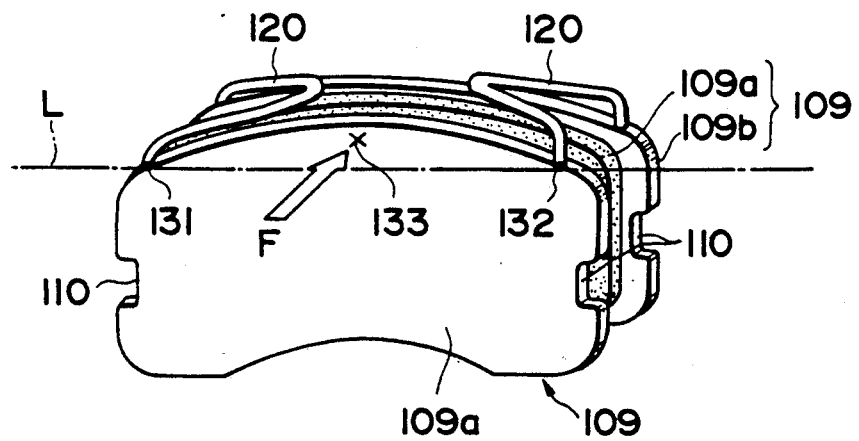
FIG. 16 is a perspective view of a pad assembly to be used in the brake caliper mounting apparatus of FIG. 11.
Figure 17:
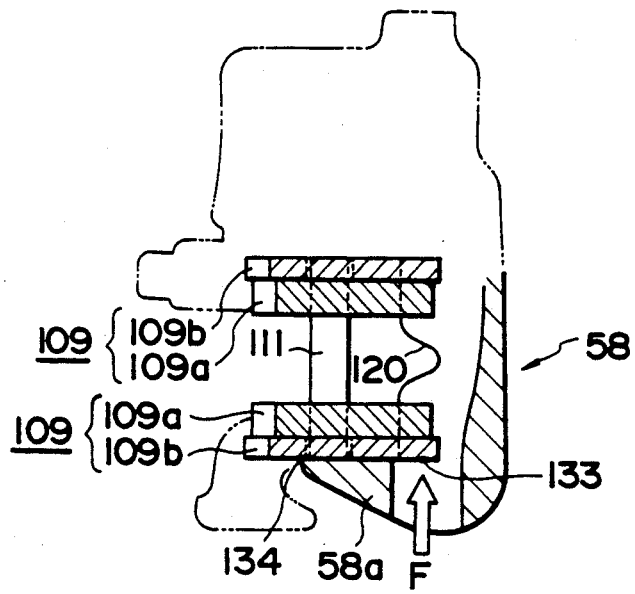
FIG. 17 is a partial sectional view taken along line XVII—XVII of FIG. 13.
Figure 18:
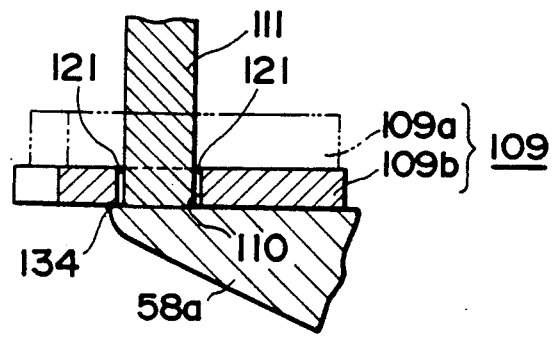
FIGS. 18(A) and 18(B) are sectional views illustrating a tilting movement of a pad in the brake caliper mounting apparatus of FIG. 11.
Figure 18:
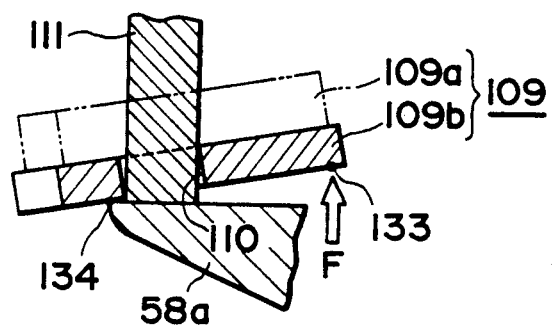

FIG. 13 is a plan view of a caliper 58 having a pair of pads 109 provided in the inside thereof, and FIG. 14 is a rear elevational view of the caliper 58. Each of the pads 109 is constituted such that, as shown in FIGS. 15 to 17, a pad body 109a is mounted on a pad base plate 109b having an area slightly greater than that of the pad body 109a.

A pair of springs 120 extend between rear faces of the pad base plates 109b of the pads 109 to urge the pads 109 in their opening direction. Reference numerals 131 and 132 denote anchoring points of the springs 120 to the pad base plate 109b of the lower pad 109.

A pair of recesses 110 are formed at opposite side portions of each of the pad base plates 109b. A pair of guides 111 are provided on left and right inner wall portions of the caliper 58 and are engaged in recesses 110 at positions shown in FIGS. 13 and 14 and extend in upward and downward directions. Thus, the pads 109 are slidably movable under the guidance of the guides 111. A small gap 121 is formed between each of the recesses of the pad base plate 109b of the lower pad 109 and the corresponding guide 111 as shown in FIG. 18(A). Due to the presence of the gap 121, when a force F acts in an upward direction upon a point 133 at a rear end portion of a mid portion of a bottom face of the pad base plate 109b of the lower pad 109, the lower pad 109 is tilted around a point 134 at a front end of the bottom wall 58a of the caliper 58 as seen in FIG. 18(B). Consequently, the front end portions of the pads 109 are opened to allow the disk 53 to be inserted into the gap between the pads 109. The point 133 of application of the force F on the bottom face of the lower pad 109 must necessarily be at a position outwardly of a straight line L interconnecting the anchoring points 131 and 132 of the springs 120 to the base plate 109b of the lower pad 109 as shown in FIGS. 15 and 16.

Figure 19:
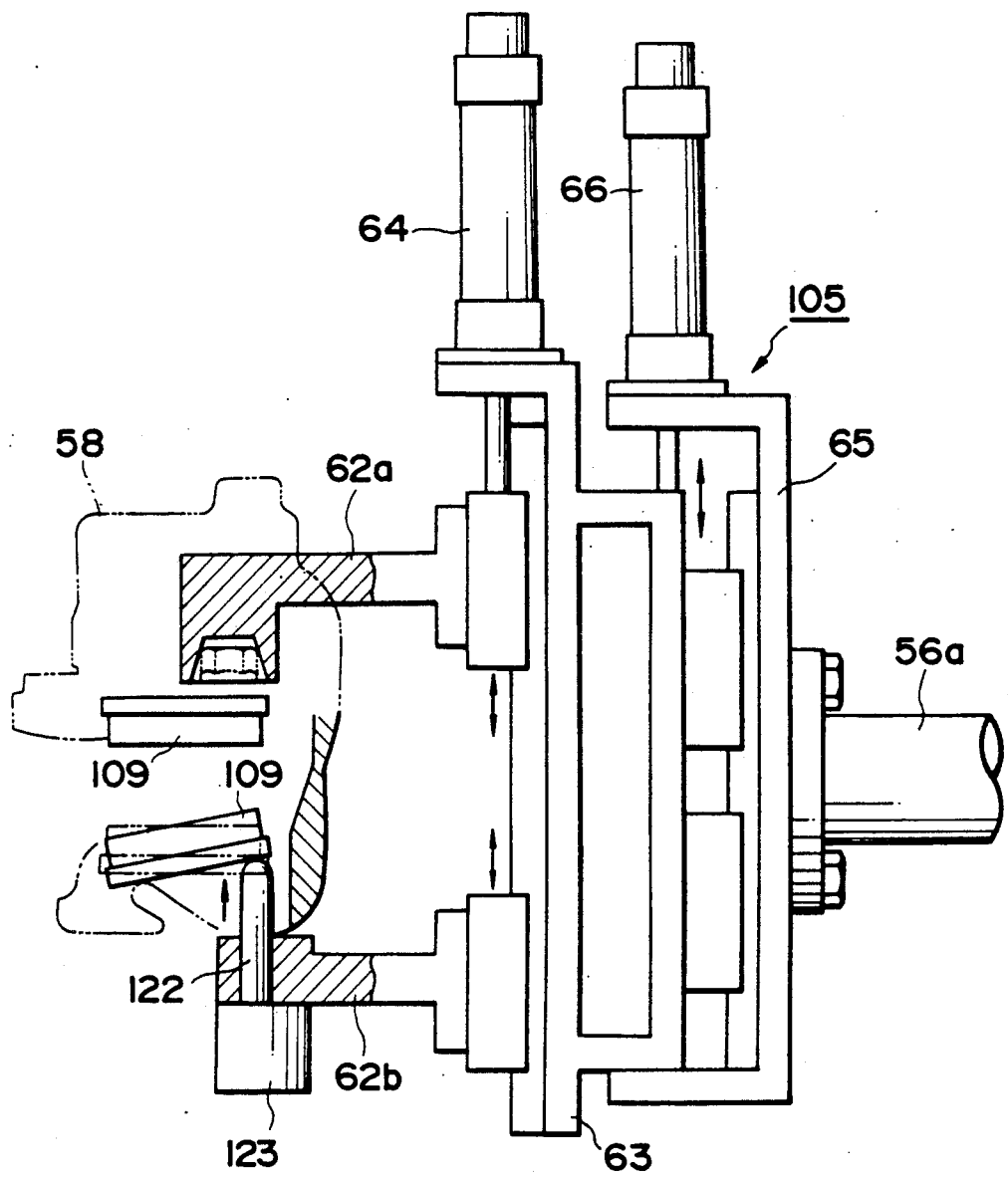
FIG. 19 is a side elevational view, partly in section, showing an example of construction of a robot hand for clamping a caliper in the brake caliper mounting apparatus of FIG. 11.

FIG. 19 shows an example of construction of the robot hand 105 provided on the working robot 56. The robot hand 105 in the present embodiment has a construction substantially similar to that of the robot hands 55 and 55a in the second embodiment described hereinabove. The robot hand 105 includes two upper clamp arms 62a and lower central clamp arm 62b for clamping a caliper 58 from above and below, respectively, and a slide base 63 supporting the clamp arms 62a and 62b for sliding movement in upward and downward directions thereon. The slide base 63 has a clamp cylinder 64 mounted thereon for operating the clamp 62a and 62b in a synchronized relationship so that the clamping directions and the unclamping directions thereof coincide with each other. When the clamp cylinder 64 is operated, the clamp arms 62a and 62b are slidably moved in an upward or downward direction by way of a synchronizing mechanism not shown to clamp or unclamp a caliper 58. Further, the slide base 63 is mounted for sliding movement in upward and downward directions on a base member 65 secured to an end of a robot arm 56a, thereby constituting a floating mechanism for absorbing possible displacement of positions of the clamp arms 62a and 62b in upward and downward directions. A piston of a balance cylinder 66 secured to the base member 65 is connected to the slide base 63.

At an end portion of the clamp arm 62b for clamping a central portion of a lower face of a caliper 58 is mounted a mechanism for applying an upwardly acting force F to a point 133 of application on a lower face of a base plate 109b of a lower pad 109. The mechanism includes a push rod 122 provided for sliding movement in upward and downward directions at an end portion of the clamp arm 62b, and a driving motor 123. When the motor 123 is energized, the push rod 122 is projected into the inside of a caliper 58 from an opening formed in a bottom wall 58a of the caliper 58. Consequently, a force F is applied to the point 133 of application on the base plate 109b of the lower pad 109 to tilt the pad 109.

Thus, according to this embodiment, the gap between the pads 109 on the mounting end side of a caliper is expanded beyond a preset dimension of the gap when the caliper is to be mounted by the robot hand 105, and accordingly, insertion of the disk 53 into the gap is facilitated significantly.

We claim:

1. A brake caliper mounting method for inserting a disk into a gap between a pair of pads carried in an opposing spaced relationship on a caliper to assemble the disk to the caliper, said method comprising:

a first step of holding the caliper by means of holding means;

a second step of contacting positioning means with a face of the disk to determine a fitting position of the caliper onto the disk; and a third step of fitting the caliper held by said holding means onto the disk along the position of the face of the disk determined by said positioning means.

2. A brake caliper mounting method according to claim 1, wherein the second step comprises the steps of moving said positioning means which has a guide face and a contacting member to a position near the disk such that said contacting member overlaps the disk; and moving said positioning means in a thicknesswise direction of the disk so that said contacting member thereof contacts the face of the disk and said guide face of said positioning means is disposed coplanar with the face of the disk.

3. A brake caliper mounting method according to claim 2, wherein the third step comprises the steps of feeding the caliper to a position near said guide face of said positioning means such that either one of the pads of the caliper overlap said guide face;

moving the caliper to said guide face of said positioning means so that one pad contacts said guide face;

slidably moving the one pad on said guide face of said positioning means to advance the caliper from the guide face to the disk;

retracting said guide face of said positioning means from the disk; and moving the caliper further to the disk to thereby mount the caliper onto the disk.

4. A brake caliper mounting method according to claim 3, wherein, at the step of moving the caliper to said guide face of said positioning means so that the one pad contacts said guide face, the caliper is moved over a distance greater than a distance of a space between the caliper and said guide face while such excessive amount of movement is resiliently absorbed.

5. A brake caliper mounting method according to claim 1, wherein the first step comprises the steps of holding the caliper in a predetermined posture at a supplying position of the caliper;

causing said holding means to access the caliper held at the caliper supplying position;

restraining the caliper to a posture parallel to the face of the disk;

holding the caliper by said holding means in a condition in which the gap between said pads is expanded to a maximum extent;

canceling the held condition of the caliper at the caliper supplying position;

removing the caliper from the caliper supplying position by said holding means;

feeding the caliper to an assembling position for assembly to the disk; and positioning said holding means with respect to the assembling position.

6. A brake caliper mounting method according to claim 5, wherein the second step comprises a step of moving said positioning means in the thicknesswise direction of the disk so as to contact said positioning means with the face of the disk, and moving said holding means in synchronized relationship with the movement of said positioning means to effect positioning of said holding means with respect to the disk.

7. A brake caliper mounting method according to claim 6, wherein the third step comprises the steps of inserting the disk into the gap between the pair of pads;

cancelling, after completion of the inserting operation, the held condition of the caliper by said holding means;

mounting the caliper onto the disk by fastening means; and cancelling the restraint of the posture of the caliper.

8. A brake caliper mounting method according to claim 1, wherein the pair of pads are placed in advance into a condition wherein ends thereof at which the disk is to be inserted into the gap between the pads are expanded.

* * * * *